Jan. 13, 1942.    C. M. HATHAWAY    2,269,973
MULTIPLE RANGE CIRCUIT TIMER
Filed June 20, 1941
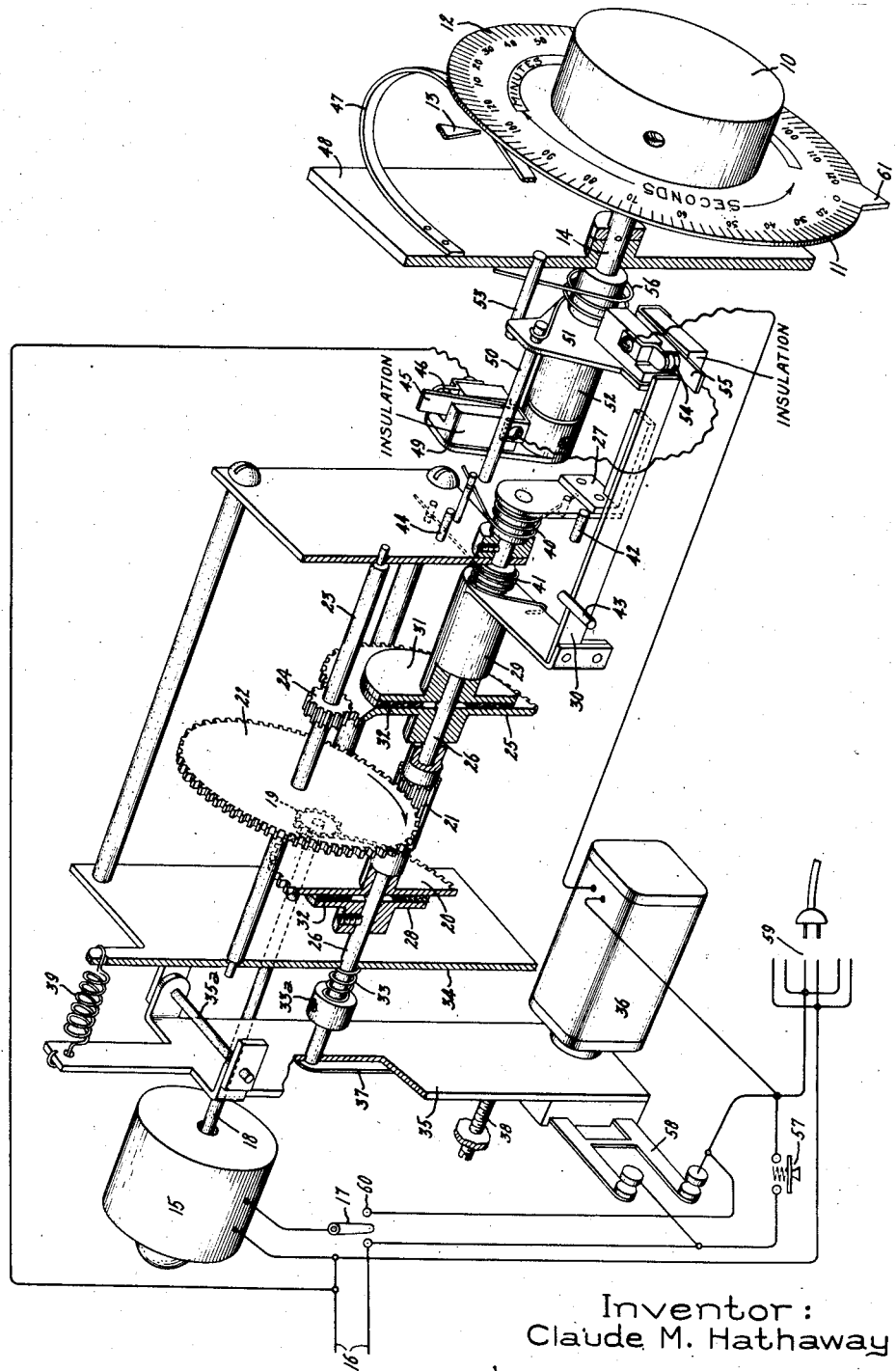
Inventor:
Claude M. Hathaway,
by Harry E. Dunham
His Attorney.

Patented Jan. 13, 1942

2,269,973

UNITED STATES PATENT OFFICE 2,269,973

MULTIPLE RANGE CIRCUIT TIMER

Claude M. Hathaway, Denver, Colo., assignor to General Electric Company, a corporation of New York Application June 20, 1941, Serial No. 398,912

10 Claims. (Cl. 161—1)

My invention relates to circuit timers such as those used for timing photograph and other processes, and one of its objects is to provide a process timer having a wide range of time setting adjustment. Another object of my invention is to provide a multiple range timer having provisions for obtaining coarse and fine time-setting adjustments, such for example as minutes and seconds, depending upon the length of time setting desired. Another object of my invention is to provide a compact mechanism of such multiple range type in which the transfer from one range to the other is semi-automatic and is accomplished by merely performing a usual time setting operation by a single time setting adjustment device.

The features of my invention which are believed to be novel and patentable will be pointed out in the claims appended hereto. For a better understanding of my invention reference is made in the following description to the accompanying drawing showing a perspective, partially sectional view of a timer embodying my invention. In the particular timer shown there is provided an adjustable knob 10 having a circular disk carrying a "seconds" scale 11 and a "minute" scale 12 integral therewith, all secured to a shaft 14. The scales 11 and 12 cooperate with the single stationary index 13 for the purposes of setting the timer. The "seconds" scale 11 extends over nearly 180 degrees of the circular disk and the "minute" scale 12 extends over a substantially similar distance so that the two scales occupy substantially the entire periphery of the disk. It will be noted that the "seconds" scale is graduated from 0 to 120 "seconds" and the "minute" scale 12 is graduated from 2 to 120 "minutes," also that the 120 "seconds" graduation and the 2 "minute" graduation coincide. The two scales may therefore be considered as a single scale but with the part 11 corresponding to two minutes greatly expanded as compared to the remaining part. As shown, the smaller graduations on scale part 11 correspond to two seconds and the smaller graduations on the scale part 12 correspond to two minutes and both sets of these graduations have the same spacing so that the part 11 of the scale is expanded 60 times, as compared to that of part 12. Turning the knob 10 counterclockwise increases the time setting, first over the seconds graduations and then over the minute graduations in a continuous progressive manner. The dial as shown is set for a time setting of 100 seconds which means that the device upon being set into operation will perform a desired switching operation at the end of a 100 second period. In like manner the device may be set to perform a switching operation at the end of any other time period for which the dial may be set, up to 120 minutes.

The timing means for timing the operation of the device is represented at 15 and may comprise a self-starting synchronous motor where regulated frequency alternating current supply is available. Such supply is represented at 16 with the motor 15 connectable thereto through a switch 17. The motor 15, when in operation, drives a shaft 18 on which is a pinion 19 meshing with a gear 20. For the timing arrangement selected for the purposes of illustration, gear 20 will be driven in a counterclockwise direction at the high speed timing rate corresponding to the "seconds" graduations of scale 11. That is, gear 20 is driven at a speed which would rotate it through the same number of degrees as is the length of scale 11 in 120 seconds. Gear 20 is integral with a pinion 21 which drives a gear 22 on a shaft 23 with a pinion 24 and pinion 24 drives a gear 25 at the slow speed timing rate corresponding to the graduations of "minute" scale 12. That is, gear 25 rotates through an angle corresponding to the length of scale 12 in 118 minutes. The timing gears 20 and 25 are mounted for rotation about a shaft 26 on the axis of rotation of the time setting knob 10. Shaft 26 has secured to it a time interval measuring and switch operating arm 27 and a clutch member 28 and is movable endwise slightly for the purpose of engaging clutch part 28 with the adjacent side of gear 20 in order that the shaft 26 and switch operating arm 27 may be driven in a counterclockwise direction by gear 20 at the high speed timing rate when the clutch is engaged. Also mounted for rotation on shaft 26 is a hollow shaft 29 having a switch operating arm 30 and a friction clutch disk 31 adapted to be clutched with gear 25 so as to drive hollow shaft 29 in a counterclockwise direction at the slow speed timing rate of gear 25. The part 29—30 comprises a second time interval measuring and switch operating means.

Between the clutch parts 28 and 20 and between clutch parts 25 and 31 are friction disks 32 which may be made of cork or the like. It will be noted that gear 20 and its integral pinion 21 are located on shaft 26 between clutch disk 28 and the clutch and gear part 25 with only a slight spacing. Hence when shaft 26 is moved endwise to the right to engage the clutch at 28—20, gear 20 and its integral pinion 21 also move to the right sufficiently for the hub of pinion 21 to engage and move gear 25 to the right slightly so as to engage the clutch 25—31.

Normally both clutches are disengaged by reason of a compression spring 33 located between a collar 33a secured to shaft 26 and the stationary supporting plate 34 which arrangement urges shaft 26 endwise to the left to loosen the clutches sufficiently so that there is no driving action between gear 20 and high speed timing shaft 26 or between gear 25 and low speed timing shaft 29. This is the condition represented in the drawing.

Shaft 26 may be moved to the right to simultaneously engage both clutches by a relay device having an armature 35 pivoted at 35a and a stationary iron core electromagnet 36. The left end of shaft 26 abuts against the armature 35 or more preferably against a leaf spring 37 secured to the armature such that when the electromagnet 36 is energized and the armature 34 attracted, shaft 26 is resiliently urged to the right and the clutches are engaged. Armature 35 is biased to detracted position against a suitable stop represented at 38 by a spring 39 when the electromagnet 36 is not energized at which time spring 33 loosens the clutches.

When the clutches are disengaged, springs 40 and 41 bias the high speed switch operating arm 27 and the low speed switch operating arm 30 in clockwise directions against stops 42 and 43, respectively. When switch arm 27 is driven in a counterclockwise direction by the high speed timing shaft 26, it has a range of movement from stop 42 to a stop 44 corresponding to an arc equal to the length of the arc of "seconds" scale 11 and during such movement it may engage with a resilient switch contact member 45 to open switch contacts at 46. The switch just mentioned is mounted on shaft 14 and may be adjusted to various rotary positions within the range of movement of switch operating arm 27 by the turning of knob 10 and the timing position to which adjusted will be indicated by pointer 13 on "seconds" scale 11. As indicated in the drawing, the knob 10 is adjusted to indicate a timing adjustment of 100 seconds. This means then that 100 seconds after electromagnet 36 is energized and clutch 28—20 is engaged, switch operating arm 27, moving from stop 42, reaches contact member 45 and opens switch contacts 46. Had the time adjustment been made for 50 seconds, the switch position would have been approximately some 40 degrees clockwise from the position shown and would have been opened in 50 seconds by switch operating arm 27. The shaft 14 and the parts secured thereto are prevented from turning easily as by means of friction springs 47 between the scale disk and stationary supporting plate 48 so that when the time has been set by turning of knob 10 the adjustment will remain fixed until there is a manual adjustment for a different setting. The shaft 14 with the switch 46 secured thereto may not only be adjusted over the range of movement of high speed switch operating arm 27 but it may be adjusted counterclockwise beyond such range since when arm 27 reaches stop 44 it must stop and, assuming the motor to be in operation, the clutch at 28—20 if engaged will then slip. Such adjustment is made when it is desired to set the device for timing intervals in excess of two minutes and it renders the faster moving short time interval measuring device 27 inoperative to open its switch 46.

When the switch 46 has been adjusted counterclockwise to the two minute or 120 second position its supporting structure 49 engages with a pin 50 secured to a second switch supporting member 51. Member 51 is on a sleeve 52 rotatable about shaft 14. It is normally biased in a clockwise direction against a stop 53 by a spring 56 which position is the one shown in the drawing and corresponds to the position where part 49 at its two minute adjustment position will just engage with the pin 50. This is also the limit position of arm 27 against stop 44. Member 51 carries the normally closed switch contacts 54, one of which is mounted on the resilient contact member 55 extending into the path of movement of the slow speed switch operating arm 30. Arm 30 has a range of movement counterclockwise from stop 43 corresponding to slightly more than the length of the minute scale 12. When arm 30 moves against contact 55, the switch contacts 54 are opened in a manner similar to the opening of contacts 46 by arm 27. When the switch supporting part 51 is against stop 53 it requires exactly two minutes for the slow moving arm 30 to move from its stop 43 against contact finger 55 to open the contacts 54. Hence if the timing dial is set for a two minute or 120 second adjustment, contacts 46 will be opened by arm 27 as it comes against stop 44 and simultaneously contacts 54 will be opened by arm 30. This is the one point in the adjustment where the two switch-operating operations coincide or overlap. For any adjustment within the short time range, that is of less than 120 seconds, only switch contacts 46 are opened and for any adjustment within the long time range, that is in excess of 120 seconds, only switch contacts 54 are opened.

For adjustments in excess of two minutes knob 10 is turned further counterclockwise to bring the minute scale 12 opposite index 13 and to any desired minute indication up to the limit of the scale of 120 minutes. Such adjustment moves both switches 46 and 54 counterclockwise beyond their two minute positions, positioning switch 46 beyond the reach of operating arm 27 and positioning switch 54 in advance of slow operating arm 30 by an amount corresponding to the number of minutes indicated by pointer 13 on scale 12 and the time required for arm 30 to reach and open the switch 54. In the time thus set, arm 30 driven through clutch 25—31 will advance from its stop to contact member 55 to open the switch 54. It is thus seen that the transfer of the timing operation from the fast moving short time timing mechanism as indicated on dial 11 to the slow moving long time timing mechanism as indicated on dial 12 takes place semi-automatically without effort on the part of the operator other than adjustment of the time of operation desired. If the setting is for a time indicated on scale 12 and a short time setting and operation less than two minutes is desired, the operator simply turns the knob 10 to the desired time indication on the "seconds" scale. Switch part 51 moves back against stop 53 and switch 46 is returned to within the operating range of switch operating member 27.

It will be noted that the switches comprising contacts 46 and 54 are in series with electromagnet 36 and this circuit is connected across the line 16 through a normally open push button switch 57. In parallel with the push button switch is a switch 58 which closes when the electromagnet is energized and pulls in its armature 35, thus establishing a holding circuit for the electromagnet and allowing the push button switch to be released. The parallel connected switches 57 and 58 also supply power to one or more plug contacts or circuits at 59 to be controlled by the timer. As noted, the timing motor 15 may also be connected through switches 57 and 58 if desired by moving switch 17 to contact 60. The complete operation of the timer will now be briefly reviewed, starting from an idle condition:

Motor 15 and electromagnet 36 will be deenergized, switches 57, 58 and 17 open, switches 46 and 54 closed, clutches 28 and 25 disengaged and arms 27 and 30 against their stops 42 and 43, as shown. The operator first adjusts the knob 10 for the time of operation desired. If it is for a time less than two minutes, for example, the 100 second adjustment illustrated switch supporting member 51 will be against its stop 53, and switch supporting member 49 will be spaced clockwise from pin 50 a distance corresponding to 120−100+20 seconds of high speed travel of arm 27 or a distance counterclockwise of arm 27 corresponding to 100 seconds of its rate of travel. The operator next closes switch 17. If he closes it to the left the motor starts immediately. If he closes it to the right on contact 60 the motor does not start until push button switch 57 is closed.

To start the timing operation the operator momentarily pushes in on switch 57. This energizes electromagnet 36 which pulls in and closes switch 58 and establishes its own holding circuit. Any circuits connected at 59 are energized at this time at the beginning of the timing operation. Armature 34 moves shaft 26 endwise to the right and engages both clutches 28—20 and 25—31. Since the motor is in operation, high speed arm 27 and slow speed arm 30 are driven counterclockwise away from their stops. This increases the tensions in springs 40 and 41. In 100 seconds arm 27 opens contacts 46 through engagement with finger 45. This interrupts the circuit of electromagnet 36, armature 35 is released, switch 58 is opened, the clutches are disengaged and arms 27 and 30 are returned clockwise against their stops by springs 40 and 41. The circuits connected at 59 are interrupted with the opening of switch 58. Contacts 46 reclose as soon as arm 27 moves away therefrom. The motor 15 stops if connected through switch 58.

Suppose, now, the operator sets the dial for 100 minutes operation. Member 49 engages pin 50 and both members 49 and 51 are moved counterclockwise to a position where it will require the arm 30, 100 minutes to reach and open switch 54. This likewise moves member 49 clockwise to a point where arm 27 cannot open switch 46. The operator then starts a timing operation as before by momentarily closing switch 57. The various operations incident to a starting operation previously described takes place. Now, when arm 27 reaches stop 44 it stops with shaft 26 and clutch 28—20 slips so that contacts 46 will not be opened. Slow speed arm 30 however, continues to advance and when it reaches contact member 55 at the end of 100 minutes, switch 54 is opened. All parts are automatically returned to the idle open circuit condition as previously described.

If the switch 58 is accessible and convenient to close by hand push button switch 57 may be dispensed with. However, the switch 57 may be located any desired distance from or in a different room from the remainder of the device and will generally be used for that reason.

In the device illustrated the length of the seconds and minute scales and the corresponding range of movements of the fast and slow operating parts are equally divided. However, any other desired division may be used without departing from the principle of the invention. Likewise the time units employed may be minutes and hours or seconds and hours instead of seconds and minutes.

The dial assembly rotated with knob 10 preferably has stop means to prevent turning beyond the range of the device and to simplify the drawing in this respect I have illustrated this as a projection 61 extending from the edge of the dial and engageable with stationary index 13 in the two extreme rotary positions.

The time adjustment may be changed while the device is in operation by rotation of knob 10 and the timing operation may be cut off by the operator at any time by rotating knob 10 and the switches 46 or 54 clockwise until one of them is opened by reason of engagement with its operating arm.

What I claim as new and desire to secure by Letters Patent of the United States is:

1. A timer comprising a timer motor, a pair of rotary time interval measurement switch operating means, driving connections including clutches through which said means are individually driven by said motor at different rates of speed when said clutches are engaged, a pair of stops for determining the initial positions of said means and against which they are returned when the clutches are disengaged, an electromagnet which when energized engages said clutches to start a timing operation, a switch adjustable to different rotary positions in the path of movement of the higher speed means, a switch adjustable to different rotary positions in the path of movement of the lower speed means, said switches being normally closed and connected in series with said electromagnet but being opened when engaged by their respective switch operating means, and a time setting dial means for adjusting the rotary positions of said switches and indicating the time for which adjusted.

2. A timer comprising a timer motor, a pair of rotary time interval measuring means, a driving connection including clutches through which said means are individually driven at different speeds when said clutches are engaged, a pair of stops for determining the initial positions of said pair of means and against which they are returned when the clutches are disengaged, an electromagnet which when energized engages said clutches to start a timing operation, a pair of time setting members adjustable to different rotary positions in the paths of movement of said pair of means, a pair of normally closed switches connected in series with said electromagnet, one of which is opened by engagement between the slower moving time interval measuring means and its time setting member and the other of which is opened by engagement between the faster moving time interval measurement means and its time setting member and a time setting dial means having time scales corresponding to the slow and fast rates of movement of said time interval measurement means for adjusting the rotary positions of said members and for indicating the time for which adjusted.

3. A process timer for performing a switching operation at the end of a desired time interval and adjustable for such operation over a wide variety of different time intervals inclusive of a short time interval range and a long time interval range, said timer comprising a timer motor, a fast moving time interval measuring and switch operating mechanism adjustable for timing operations over the short time interval range and a slow moving time interval measuring and switch operating mechanism adjustable for timing operations over the long time interval range, both mechanisms being driven by said motor, common setting means for both mechanisms, and means made effective by adjustment of said setting means for operation within the long time interval range for rendering the fast moving time interval switch operating mechanism inoperative.

4. A process timer for performing a circuit controlling operation at the end of a desired time interval and adjustable for such operation over a wide variety of different time intervals including a short time interval range and a long time interval range, comprising a timer motor, a pair of switches connected so that either may perform the desired circuit controlling operation, a short time interval measuring means for operating one of said switches, a long time interval measuring means for operating the other of said switches, both of said switch operating means being operated by said motor, a single time setting means adjustable for determining the time setting of the timer for both of said ranges, means for preventing the operation of the short time range switch when the setting is within the long time range and means for preventing the operation of the long time range switch when the setting is within the short time range.

5. A process timer of the type adapted to perform a circuit controlling operation at the end of a desired time interval comprising a pair of time interval measuring and circuit controlling devices either of which may perform the desired circuit controlling operation, a timer motor for operating both of said devices, one device having a high speed movement and a short time interval range of operation, the other device having a slow speed movement and a long time interval range of operation, common means for adjusting the time intervals of operation of said devices over their ranges of operation and indicating such adjustments, the maximum time adjustment of the short time range device being the same as the minimum adjustment of the long time range device and means for preventing a circuit controlling operation by the short time range device when the adjustment is for a time interval in excess of its range.

6. A process timer for performing a circuit controlling action at the end of a desired time interval comprising coaxial high and low speed shafts, a timer motor, driving connections between said motor and shafts each connection including a slip friction clutch, means driven by the high speed shaft and adjustable for different operating times over a short time range for performing the desired circuit controlling operation, means driven by the slow speed shaft and adjustable for different operating times over a long time range for also performing the desired circuit controlling operation, a dial and pointer, one of which is adjustable about the axis of rotation of said coaxial shafts for adjusting the time of operation of both of said means and a stop for the means driven by the high speed shaft to stop its operation and prevent circuit controlling operation by it beyond a range of movement corresponding to the short time range.

7. A process timer comprising a timer motor, a pair of coaxial shafts, driving connections including clutches between said motor and shafts whereby they may be driven at different rates when the clutches are engaged, a short time range circuit controlling device operated from the higher rate shaft, a long time range circuit controlling device operated from the lower rate shaft, said shafts having initial rotary positions to which they are returned when the clutches are disengaged, said circuit controlling devices having parts rotatable with said shafts and other parts adjustable about the axis of rotation of said shafts to be engaged by such rotating parts to perform a circuit controlling operation, means for adjusting the rotary positions of both adjustable parts, said adjustment determining the time interval of operation and selecting the circuit controlling device for performing such operation, and a scale having different parts graduated in time units corresponding respectively to the different rates of movement of the two shafts and on which the adjustment is indicated.

8. A process timer, comprising a timer motor, a pair of rotary time interval measuring means, driving connections between said motor and time interval measuring means including clutches, an electromagnet which when energized engages said clutches, said time interval measuring means having initial rotary positions to which they are returned when the clutches are disengaged and from which they are advanced at different rates when the clutches are engaged, a normally closed switch in the path of movement of each time interval measuring means, which switches are opened when engaged by their corresponding time interval measuring means, said switches being connected in series in the energizing circuit of said electromagnet whereby the opening of either switch causes disengagement of said clutches and the return of the time interval measuring means to their initial positions, common means for adjusting the positions of said switches to vary the time interval of the switch opening operation of said time interval measuring means, said adjusting means having a continuous scale divided into a part graduated in "seconds" on which the time setting of one switch may be indicated and a part graduated in "minutes" on which the time setting of the other switch may be indicated, the upper second graduation and the lower minute graduation coinciding on said scale and means for stopping the faster rate time interval measuring means at a time corresponding to the upper "second" graduation on such scale.

9. A double range process timer comprising a pair of time interval measuring means, a pair of switches operated thereby at the ends of the measured time intervals, a single timer motor for driving said pair of time intervals measuring means at different timing rates, a single setting device for determining the time intervals to be driving said pair of time interval measuring means, said device having two time scales graduated in time units corresponding to the different time ranges of operation of the pair of time interval measuring means, and means preventing the operation of either switch by its time interval measuring means when the time setting is outside the time range of operation thereof.

10. A double range process timer comprising a time setting device including a graduated circular dial and pointer, one of which is rotatable for setting the time interval to be measured, said dial having scales graduated in large and small time units such as minutes and seconds, each extending over approximately half of the periphery of said dial and having the upper graduation of the small time unit scale coinciding with the lower graduation of the large time unit scale, a pair of time interval measuring circuit-controlling devices having different time rates of operation corresponding to the large and small time unit graduations on said dial, a timer motor for operating said devices, said devices having parts driven by said motor and parts adjustable by said time setting device such that the time of operation of the slower rate circuit controlling device is indicated on the larger time unit scale and the time of operation of the faster rate circuit controlling device is indicated on the smaller time unit scale, and provisions for limiting the range of movement of the faster rate motor-driven part and of the adjustable part of the slow rate circuit-controlling device to prevent circuit-controlling operation thereby outside of their corresponding time setting ranges as indicated on said scales.

CLAUDE M. HATHAWAY.

CERTIFICATE OF CORRECTION.

Patent No. 2,269,973.  January 13, 1942.

CLAUDE M. HATHAWAY.

It is hereby certified that error appears in the printed specification of the above numbered patent requiring correction as follows: Page 3, first column, line 26, for "120-100+20" read --120-100=20--; page 4, second column, line 69, claim 9, for "intervals" read --interval--; line 72, same claim, for "driving said" read --measured by the--; line 73, strike out "ing"; and that the said Letters Patent should be read with this correction therein that the same may conform to the record of the case in the Patent Office.

Signed and sealed this 10th day of March, A. D. 1942.

(Seal)

Henry Van Arsdale,
Acting Commissioner of Patents.